Dec. 26, 1939.　　　A. M. WOLF　　　2,185,165

POWER PLANT

Original Filed May 18, 1932

INVENTOR.
AUSTIN M. WOLF
BY M. C. Giddance
ATTORNEY

Patented Dec. 26, 1939

2,185,165

UNITED STATES PATENT OFFICE 2,185,165

POWER PLANT

Austin M. Wolf, Plainfield, N. J.

Continuation of Application Serial No. 612,057, May 18, 1932. This application April 9, 1936, Serial No. 73,584

16 Claims. (Cl. 180—54)

This invention relates to motor vehicles and more particularly to driving mechanism or power plants therefor, the present application being a continuation of my original application for patent Ser. No. 612,057 filed May 18, 1932.

Generically considered, the invention has for its primary object and purpose an improved mounting and arrangement of the engine, clutch and power transmission gearing for more directly transmitting the driving torque of the engine to the vehicle driving wheels.

More particularly it is the object of my invention to provide, in combination with the differential axle drive mechanism and propelling means therefor, a power plant forming a part of the sprung weight of the vehicle and embodying an engine, a clutch and a clutch driven means in closely spaced relation to the differential, said units being mounted in transversely distributed spaced apart relation to extend to relatively opposite sides of the propelling means. A power input shaft is connected with the clutch and said clutch driven means includes a power output shaft operatively connected with the propelling means, said input and output shafts being disposed in parallel relation with the engine crank shaft.

It is another object of the invention to provide an assembly as above characterized embodying means which makes it unnecessary to maintain exact alignment between the engine shaft and the driving or transmission shaft, so that, notwithstanding the wear of the crank shaft bearings binding will not occur, and the power will be smoothly and efficiently transmitted from said crank shaft to the differential driving mechanism.

In one embodiment of the invention, the engine is transversely positioned at one side of the vehicle center line while the clutch is disposed in axially aligned relation therewith at the opposite side of said center line and the power transfer gearing is interposed between the engine and clutch.

It is also another object of the invention to incorporate in the assembly an accessory such as a compressor, blower fan or the like connected with the power input shaft.

Another detail object of the invention is to provide a very compact and space conserving arrangement of the various elements, in which the power output or take-off shaft which is connected with the propelling means for the differential drive is of tubular form and surrounds the input shaft in co-axial spaced relation therewith.

With the above and other objects in view the invention consists in the improved motor vehicle driving mechanism or power plant, and in the form, construction and relative arrangement of its several parts as will hereinafter be more fully described, illustrated in the accompanying drawing and subsequently incorporated in the subjoined claims.

In the drawing wherein I have shown a simple and practical embodiment of the invention and in which similar reference characters designate corresponding parts throughout the several views.

Figure 1:
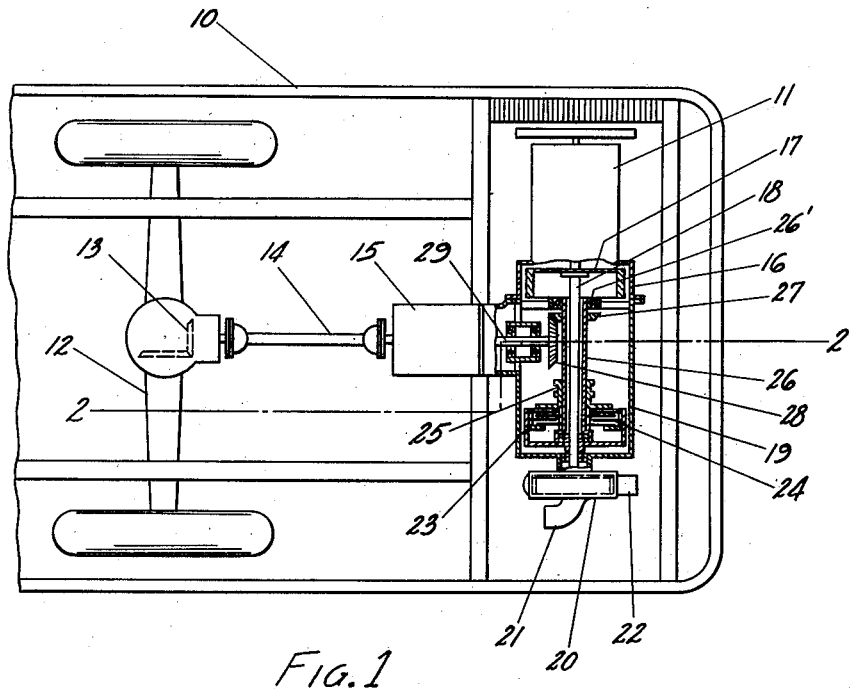
Fig. 1 is a fragmentary top plan view of the vehicle chassis or frame showing one arrangement of the driving mechanism or power plant, certain parts of the latter being shown in section.
Figure 2:
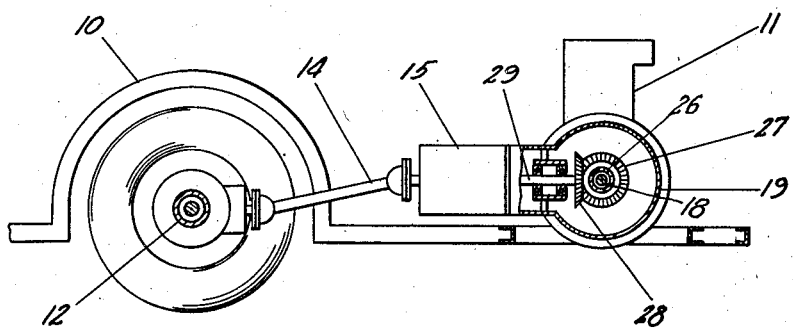
Fig. 2 is a longitudinal sectional view taken on the line 2—2 of Fig. 1.

Referring for the present, more particularly to Figs. 1 and 2 of the drawing, for purposes of illustration, I have shown my present invention applied to the rear end of a motor vehicle chassis or frame 10 and constituting, together with said frame, a part of the sprung weight of the vehicle. Of course, it will be understood that the invention is applicable to both pleasure and commercial vehicles and in the present instance, the frame or chassis 10 is of the general conventional type commonly used on motor coaches.

In the illustrated embodiment, the engine 11 is mounted in the vehicle frame in transverse relation thereto at one side of its longitudinal center line and in rearwardly spaced relation from the rear driving axle 12 of the vehicle and the differential drive mechanism 13 thereof. This mechanism is connected by the longitudinally extending propelling shaft 14 with suitable change speed mechanism in the housing 15 mounted on the vehicle frame.

A housing is fixed to the inner end of the engine 11 and extends transversely therefrom upon the opposite side of the longitudinal center line of the vehicle. This housing includes the end section 16 suitably fixed to the engine cylinder block and enclosing the flywheel 17 on the power input shaft 18 axially aligned with the engine crank shaft and suitably coupled thereto. The other end of this shaft is supported in a suitable anti-friction bearing on the end wall of the housing section 19. The shaft extends beyond this end of the housing and is connected with an accessory such as the starter, generator, air compressor or other device not mounted directly upon the engine. In the present instance I have shown said shaft connected with a blower fan contained in a casing 20 supported on the end of the housing section 19 and having an inlet 21 and an outlet 22, it being understood that the said fan constitutes part of the cooling system.

Within the end of the housing section 19, remote from the flywheel 17 the clutch drum 23 is secured to the shaft 18. Within this drum the clutch discs 24 are located under control of the shiftable collar 25 mounted upon the tubular power output or take-off shaft 26. This shaft surrounds the input shaft 18 in concentrically spaced relation therefrom and at its other end is independently supported in the anti-friction bearing indicated at 26'. To this latter end of the power output shaft 26 a beveled gear 27 is fixed and is in constant mesh with a similar gear 28 on one end of the longitudinally disposed power transmission shaft 29 which is connected at its other end with the change speed gearing in housing 15. Thus, the power transfer gears 27 and 28 are interposed between the clutch and the engine and enclosed with said clutch in a common housing fixed to the inner end of the engine or motor.

It will further be seen from the above description that the power input shaft 18 is of such length, and positioned relative to the power output or take-off shaft, so that any misalignment between the engine crank shaft and the driving and driven shafts of the power transfer gearing, such as might be incident to wear of the crank shaft bearings, will not result in binding of the gears or pinions.

Of course, the clutch drum 23 will be made of the requisite size and weight so that, together with the housing section 19 and accessory 20 all located on one side of the center line of the vehicle, the other drive units and the engine on the opposite side of said center line will be properly balanced. I believe this transversely spaced distribution of the motor or engine, the transfer gearing and the clutch, with said gearing interposed between the clutch and engine, to be a novel and unique contribution to the art and patentably distinct from other known power plant assemblies, or vehicle drive mechanisms.

In addition to this more or less equal weight distribution and better lateral balancing of the motor and drive mechanism in the vehicle frame, the transverse arrangement of the several units enables the power plant assembly to be positioned in a minimum of space at the rear of the vehicle with a more direct driving connection with the differential drive mechanism for the rear axle.

In the drawing I have shown the power plant and vehicle drive mechanism mounted in rearwardly spaced relation from the rear vehicle axle. It will, however, be apparent that the power plant might be mounted in advance of said axle, or may be similarly arranged with relation to the front vehicle axle with the conventional driving connections to the differential of the rear axle. Also, where space conditions permit, the transversely distributed motor or engine and driving units may be mounted directly above the rear vehicle axle, in which case, of course, the propelling connection between the transmission and the differential will be vertically positioned instead of horizontally as shown in the drawing.

While I have above described and illustrated in the accompanying drawing one concrete example of a practical mechanical embodiment of the invention, it is nevertheless to be understood that, the combination, construction and relative arrangement of the various elements are susceptible of more or less modification. Accordingly, this invention is not to be limited in these particulars, since it may also be exemplified in various other alternative structural forms not herein specifically disclosed, but which may be fairly comprehended as within the spirit and scope of the appended claims.

I claim:

1. Vehicle driving mechanism, including differential and change speed gearing arranged in longitudinal succession between the road wheels, a tranversely disposed power plant located principally to one side of the vehicle center line, a clutch drum on the opposite side of the vehicle center line, a power shaft connecting the power plant and clutch drum and having accessory drive means beyond the clutch drum, a driven sleeve surrounding said shaft and having clutch mechanism at one end for engagement with said clutch drum and a driving pinion at its other end, and a driven gear meshing with said pinion and having drive connection with the input side of the change speed gearing.

2. A motor vehicle having a pair of road wheels, differential drive mechanism between said wheels, a power plant for driving said differential comprising an engine having a power shaft, a clutch mechanism in spaced relation to the engine, clutch driving and driven shafts located between the clutch mechanism and engine with the driving shaft connected with the engine power shaft, change speed gearing angularly arranged with respect to the engine power shaft in alinement with the space between the engine and clutch mechanism, means transmitting the drive from said driven shaft to the change speed gearing, and power transmitting means between the change speed gearing and said differential mechanism.

3. Motor vehicle driving mechanism, including a power transmitting shaft disposed longitudinally of the vehicle, change speed mechanism associated with said shaft, differential drive mechanism drive connected with the longitudinally disposed change speed mechanism, an engine and clutch assembly spaced longitudinally of the change speed mechanism and disposed transversely thereto, with the clutch and engine arranged in spaced relation on opposite sides of the axis of said shaft, and clutch driven means located between the engine and clutch and drive connected with the power transmitting shaft.

4. Motor vehicle driving mechanism including longitudinally disposed change speed mechanism, a transversely disposed engine located to one side of the longitudinal axis of said change speed mechanism, an engine driven clutch in transverse alinement with but spaced from the engine on the other side of said longitudinal axis, and clutch driven means in the space between the engine and the clutch in power transmitting relation with said longitudinally disposed change speed mechanism.

5. Motor vehicle driving means including an engine mounted in a transverse position in the vehicle frame at one side of the longitudinal center line thereof, a clutch in axial alignment with the engine crank shaft, at the opposite side of the center line of said frame, connecting means between said clutch and crank-shaft, vehicle axle propelling means, and means interposed between said clutch and engine and operatively connected with the clutch for transmitting power to said propelling means.

6. Motor vehicle driving means including an engine mounted in a transverse position in the vehicle frame at one side of the longitudinal center line thereof, a clutch in axial alignment with the engine crank shaft, at the opposite side of the center line of said frame, connecting means between said clutch and crank-shaft, vehicle axle propelling means, means interposed between said clutch and engine and operatively connected with the clutch for transmitting power to said propelling means, and a unitary housing structure for said clutch and power transmitting means fixed to the inner end of the engine.

7. Motor vehicle driving mechanism including power transfer gearing and propelling means connected therewith and disposed longitudinally of the vehicle, an engine and clutch assembly disposed transversely of the vehicle at relatively opposite sides of said propelling means, means for operatively connecting the clutch with the engine crank shaft and said power transfer gearing, and housing structure for the latter means, the clutch and the transfer gearing fixed to the inner end of the engine.

8. Motor vehicle driving mechanism including differential and power transfer gearing arranged in longitudinal succession and propelling means operatively connecting the same with each other, a transversely disposed power plant located at one side of said propelling means, a clutch arranged at the opposite side thereof, a driving connection between the engine and said clutch, and a driven connection between the clutch and power transfer gearing.

9. Motor vehicle driving mechanism including differential and power transfer gearing disposed in spaced relation longitudinally of the vehicle and propelling means operatively connecting the same with each other, a transversely disposed engine located to one side of said propelling means, an engine driven clutch in transverse alignment with but spaced from the engine on the other side of said propelling means, and clutch driven means between the engine and clutch in power transmitting relation with said transfer gearing.

10. Motor vehicle driving mechanism including differential and power transfer gearing disposed in spaced relation longitudinally of the vehicle and propelling means operatively connecting the same with each other, a transversely disposed engine having its crank shaft disposed in substantially parallel relation with the rear vehicle axle and located at one side of said propelling means, a clutch located at the opposite side of said propelling means, a power input shaft connecting the engine crank shaft with the driving clutch element, and a power output shaft connecting the driven clutch element with the power transfer gearing.

11. In a motor vehicle, differential driving mechanism and propelling means therefor, a power plant forming a part of the sprung weight of the vehicle and comprising an engine, clutch and clutch driven means spaced from the differential and mounted in transversely distributed, aligned, spaced apart relation on opposite sides of the propelling means, a power input shaft in axially aligned coupled relation with the engine crank shaft connecting said shaft with the driving clutch element, said clutch driven means including power transfer means having a tubular power output shaft surrounding and spaced from said input shaft, and a driving connection between said output shaft and the propelling means.

12. In a motor vehicle, an engine transversely positioned in the vehicle frame at one end thereof, a clutch and transfer gear housing secured to the inner end of said engine, a driving clutch element in said housing rotatably mounted in spaced axial alignment with said engine, a power input shaft fixedly connected to said clutch element and coupled to the engine crank shaft, a tubular power output shaft surrounding said input shaft, a pinion fixed to said power output shaft, a driven clutch element operatively connecting said driving clutch element with said output shaft, a differential drive mechanism, and propelling means therefor having a driving gear in mesh with said pinion.

13. Vehicle driving mechanism including differential and change speed gearing arranged in longitudinal succession between the road wheels, a transversely disposed power plant located principally to one side of the vehicle center line, a driving clutch element on the opposite side of the vehicle center line, a power input shaft connecting the power plant and clutch element, a driven sleeve surrounding said shaft and having clutch mechanism at one end for engagement with said driving clutch element and a driving pinion at its other end, and a driven gear meshing with said pinion and having drive connection with the input side of the change speed gearing.

14. A motor vehicle having a pair of road wheels, differential drive mechanism between said road wheels, a power plant for driving said differential comprising an engine having a power shaft, clutch mechanism in spaced relation to the engine, clutch driving and driven shafts located between the clutch mechanism and engine with the driving shaft connected with the engine power shaft, power transfer gearing arranged in the space between the engine and clutch mechanism in power transmitting relation with said driven shaft, and variable speed power transmitting means between said power transfer gearing and said differential mechanism.

15. Motor vehicle driving means including an engine mounted in a transverse position in the vehicle frame at one side of the longitudinal center line thereof, differential drive mechanism longitudinally spaced from the engine at the center line of the vehicle frame, and means for transmitting power from said engine to the differential drive mechanism, comprising a clutch at the opposite side of the vehicle center line, a power input shaft connecting the inner end of the engine crank shaft with said clutch, and a tubular shaft surrounding and spaced from said input shaft and drive connected at its opposite ends with said clutch and differential drive mechanism respectively.

16. Vehicle drive mechanism, including differential and change speed gearing arranged in longitudinal succession between the road wheels, a transversely disposed power plant located principally to one side of the vehicle center line, a driving clutch element on the opposite side of the vehicle center line, an accessory beyond said clutch element, a power shaft connected at one of its ends with said driving clutch element and the accessory and at its other end to said power plant, a driven sleeve surrounding said shaft and having clutch mechanism at one end for engagement with said driving clutch element and a driving pinion at its other end, and a driven gear meshing with said pinion and having drive connection with the input side of the change speed gearing.

AUSTIN M. WOLF.